(12) United States Patent
Lisso

(10) Patent No.: US 9,536,216 B1
(45) Date of Patent: Jan. 3, 2017

(54) DELIVERY OF PACKAGES BY UNMANNED AERIAL VEHICLES

(71) Applicant: Amazon Technologies, Inc., Seattle, WA (US)

(72) Inventor: Gregory Karl Lisso, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/576,066

(22) Filed: Dec. 18, 2014

(51) Int. Cl.
| | |
|---|---|
| *G01C 23/00* | (2006.01) |
| *G05D 1/00* | (2006.01) |
| *G05D 3/00* | (2006.01) |
| *G06F 7/00* | (2006.01) |
| *G06F 17/00* | (2006.01) |
| *G06Q 10/08* | (2012.01) |
| *G01C 21/00* | (2006.01) |
| *B65B 43/00* | (2006.01) |
| *B65B 59/02* | (2006.01) |

(52) U.S. Cl.
CPC ........... *G06Q 10/0832* (2013.01); *B65B 43/00* (2013.01); *B65B 59/02* (2013.01); *G01C 21/00* (2013.01)

(58) Field of Classification Search
CPC ..................... B65D 2571/00061; B65D 75/20; B65D 75/54; B65D 1/42; B65D 65/46; B65D 35/24; B65D 11/22; B65D 11/10; B65D 35/54; B65D 39/00; B65D 3/26; G06Q 10/06315; G06Q 50/28; G06Q 10/083; G06Q 10/107; G06Q 20/18; G06Q 20/327; G06Q 10/08345; G06Q 10/08; G06Q 10/20; G06Q 20/40; G06Q 20/20; G06Q 20/32; G06Q 10/10; G06Q 40/06

USPC ................. 53/317, 410, 432, 472, 490, 471; 264/115, 138, 249, 51, 54; 701/23, 3, 28, 701/409, 49, 16, 408, 522; 705/26.81, 705/26.61, 14.24, 14.52, 16, 26.2, 26.25

See application file for complete search history.

(56) References Cited

U.S. PATENT DOCUMENTS 3,419,134 A * 12/1968 Fitts ....................... B29C 44/183
    114/357
4,030,267 A * 6/1977 Arnaud ................. B29C 44/182
    264/46.6

(Continued)

OTHER PUBLICATIONS

Web page: Instapak Foam Packaging, published by Sealed Air, copyright 2014 [online][retrieved on Dec. 18, 2014] retrieved from: http://www.sealedairprotects.com/NA/EN/products/foam_packaging/instapak.aspx, 1 page.

*Primary Examiner* — Calvin Cheung
*Assistant Examiner* — Luis A Martinez Borrero
(74) *Attorney, Agent, or Firm* — Lee & Hayes, PLLC

(57) ABSTRACT

A package delivery apparatus uses an unmanned aerial vehicle (UAV) to deliver a package containing a product to a delivery destination area. The UAV uses GPS signals to guide it to the delivery destination area and an altimeter to determine its height above the delivery destination area. The UAV then adjusts its height to a preferred drop or release height for that package and product and releases the package. An optional camera allows a human operator to view the delivery destination area. An expandable foam package surrounds the product to protect the product from impact and moisture. The package may be streamlined to reduce air resistance and increase the range of the UAV. The package characteristics, such as its thickness, are determined based one or more of the weight and fragile nature of the product, and the drop height.

20 Claims, 7 Drawing Sheets

(56) References Cited

U.S. PATENT DOCUMENTS

| | | | | |
|---|---|---|---|---|
| 4,779,461 A * | 10/1988 | Gilman | G01C 5/06 | 73/384 |
| 4,862,394 A * | 8/1989 | Thompson | G01P 1/127 | 360/5 |
| 4,938,007 A * | 7/1990 | Sperry | B29C 44/182 | 53/449 |
| 5,027,583 A * | 7/1991 | Chelak | B29C 44/182 | 53/451 |
| 5,699,902 A * | 12/1997 | Sperry | B65D 81/3261 | 206/219 |
| 5,899,325 A * | 5/1999 | Bertram | B29C 44/183 | 206/219 |
| 5,996,782 A * | 12/1999 | Sperry | B29C 44/183 | 206/219 |
| 6,272,813 B1 * | 8/2001 | Sperry | B29C 44/183 | 53/127 |
| 6,279,738 B1 * | 8/2001 | Mungo | B65D 81/20 | 206/213.1 |
| 6,554,133 B1 * | 4/2003 | Kropf | B65D 85/38 | 206/320 |
| 6,712,201 B1 * | 3/2004 | Bertram | B29C 44/183 | 206/219 |
| 7,077,636 B2 * | 7/2006 | Anders | B29C 44/184 | 206/219 |
| 7,788,883 B2 * | 9/2010 | Buckley | G06Q 30/06 | 382/154 |
| 8,006,844 B2 * | 8/2011 | McKinley | B29C 44/183 | 206/219 |
| 8,340,812 B1 * | 12/2012 | Tian | G06Q 10/04 | 53/396 |
| 9,022,324 B1 * | 5/2015 | Abhyanker | B64C 13/20 | 244/189 |
| 9,037,516 B2 * | 5/2015 | Abhyanker | G06Q 30/0261 | 705/319 |
| 9,070,101 B2 * | 6/2015 | Abhyanker | G01C 1/00 | |
| 9,094,816 B2 * | 7/2015 | Maier | H04W 4/22 | |
| 9,174,733 B1 * | 11/2015 | Burgess | B64D 1/12 | |
| 9,244,147 B1 * | 1/2016 | Soundararajan | G01S 1/44 | |
| 9,305,280 B1 * | 4/2016 | Berg | G06Q 10/083 | |
| 9,336,506 B2 * | 5/2016 | Shucker | G06Q 10/083 | |
| 2001/0001446 A1 * | 5/2001 | Moreyra | B65D 81/054 | 206/453 |
| 2001/0017023 A1 * | 8/2001 | Armington | B31D 5/0047 | 53/472 |
| 2002/0039630 A1 * | 4/2002 | Rousselet | B29C 49/0005 | 428/35.7 |
| 2003/0200111 A1 * | 10/2003 | Damji | G06Q 10/08345 | 705/335 |
| 2005/0103963 A1 * | 5/2005 | Bontrager | B65D 81/053 | 248/345.1 |
| 2007/0052586 A1 * | 3/2007 | Horstemeyer | G06Q 10/06311 | 342/457 |
| 2007/0136150 A1 * | 6/2007 | Biancavilla | G06Q 10/08 | 705/28 |
| 2007/0162353 A1 * | 7/2007 | Borders | G06Q 10/0631 | 705/7.36 |
| 2007/0185613 A1 * | 8/2007 | Feldenzer | G06Q 10/087 | 700/225 |
| 2009/0045924 A1 * | 2/2009 | Roberts, Sr. | G06F 17/00 | 340/10.41 |
| 2012/0089530 A1 * | 4/2012 | Klingenberg | G06Q 10/08 | 705/330 |
| 2012/0246039 A1 * | 9/2012 | Fain | G06Q 10/08 | 705/32 |
| 2012/0323645 A1 * | 12/2012 | Spiegel | G06Q 10/08 | 705/14.1 |
| 2013/0124402 A1 * | 5/2013 | Hilbush | G06Q 10/06311 | 705/39 |
| 2013/0268455 A1 * | 10/2013 | Klingenberg | G06Q 10/08 | 705/330 |
| 2013/0292395 A1 * | 11/2013 | Stanley | B65D 85/00 | 220/645 |
| 2014/0046512 A1 * | 2/2014 | Villamar | G05D 1/0212 | 701/19 |
| 2014/0081445 A1 * | 3/2014 | Villamar | G06Q 10/087 | 700/216 |
| 2014/0095350 A1 * | 4/2014 | Carr | G06Q 10/083 | 705/26.8 |
| 2014/0164278 A1 * | 6/2014 | Cattoor | G06Q 10/083 | 705/330 |
| 2014/0207701 A1 * | 7/2014 | Kadaba | B07C 3/00 | 705/333 |
| 2014/0240147 A1 * | 8/2014 | Goda | B64D 1/16 | 340/945 |
| 2014/0254896 A1 * | 9/2014 | Zhou | B25J 9/0006 | 382/124 |
| 2015/0120094 A1 * | 4/2015 | Kimchi | B64C 39/024 | 701/3 |
| 2015/0120596 A1 * | 4/2015 | Fadell | G08B 27/003 | 705/330 |
| 2015/0120598 A1 * | 4/2015 | Fadell | G06Q 10/083 | 705/333 |
| 2015/0120603 A1 * | 4/2015 | Walker | H04L 67/306 | 705/339 |
| 2015/0121810 A1 * | 5/2015 | Bourgeois | B65D 75/008 | 53/434 |
| 2015/0125574 A1 * | 5/2015 | Arent | B65D 75/008 | 426/106 |
| 2015/0140954 A1 * | 5/2015 | Maier | H04W 4/22 | 455/404.2 |
| 2015/0154548 A1 * | 6/2015 | Skaaksrud | H04W 12/06 | 705/333 |
| 2015/0158587 A1 * | 6/2015 | Patrick | B64C 39/024 | 244/137.4 |
| 2015/0193724 A1 * | 7/2015 | Stevens | G06Q 10/083 | 705/330 |
| 2015/0242809 A1 * | 8/2015 | Gazdzinski | G06Q 10/08 | 705/332 |
| 2015/0242972 A1 * | 8/2015 | Lemmey | G06F 21/6218 | 705/80 |
| 2015/0248640 A1 * | 9/2015 | Srinivasan | G06Q 10/08355 | 705/338 |
| 2015/0266577 A1 * | 9/2015 | Jones | G05D 1/102 | 701/3 |
| 2015/0266652 A1 * | 9/2015 | Peppou | B29C 43/021 | 220/592.24 |
| 2015/0278759 A1 * | 10/2015 | Harris | G06Q 10/08355 | 705/338 |
| 2015/0298885 A1 * | 10/2015 | Giller | B65D 81/055 | 206/597 |

* cited by examiner

DELIVERY OF PACKAGES BY UNMANNED AERIAL VEHICLES

BACKGROUND

To save time and/or money, companies are seeking to deploy commercial consumer customer shipments by unmanned aerial vehicles (UAVs), which may be automated or remotely controlled, often called drones. One commonly accepted concept for deliveries by a UAV is for the UAV to land, release the package, and then take off. Another commonly accepted concept is for the UAV to stop, hover above the delivery destination, lower the package from the UAV to the ground using a line or tether, release the package, retract the tether, and then take off. Both concepts have inherent disadvantages. Landing a UAV requires vertical motion, a clear landing path, release of payload, and take-off or rising to an altitude where the flight path can be resumed. The dual path (down and up) vertical motion requires energy that reduces overall vehicle range. Tethering eliminates the need for landing and take-off—saving some energy and increasing range, but still requires some down and up motion due to practical limitations on the tether length. Further, tethering devices are complex and are prone to mechanical malfunction. They also add weight, again reducing vehicle range. Also, if the tether is long and lightweight, it may flail about after the package is released and become entangled in the surrounding environment, such as trees, bushes, outdoor or lawn furniture, etc. Further, these two concepts are only viable for a UAV which has no horizontal motion, that is, its motion is limited to hovering, going up, and going down. Thus, these two concepts are not usable with fixed wing UAVs.

Generally accepted concepts regarding delivery by UAV also include delivery of products in standardized containers, such as corrugated cardboard boxes, to provide for ease and/or standardization of handling, and for some protection of the contents. The container, however, adds weight and may add substantial wind resistance, which reduce the range of the UAV, add cost in the form of the container, and may add logistics complexity if the containers are intended to be returned.

DETAILED DESCRIPTION

The following Detailed Description is directed, in part, to technology for delivery of packages by a UAV. A customer orders a product for delivery. The customer can designate a delivery destination area (a target area) for delivery of the product by providing the Global Positioning System (GPS) coordinates for the delivery destination area rather than just a house address. The GPS coordinates can be obtained by any convenient method, two of which are described below. The delivery destination area may be, for example, a swimming pool, a pond, a front, side or back lawn, a trampoline, a rooftop, a parking lot, or another convenient location where it is unlikely that the product will be damaged or stolen, or that the dropped package will cause harm to a living being or damage to property.

The product is placed in a delivery package and the package (with the enclosed product) is attached to a UAV. The UAV is launched and flies to the delivery destination area. The UAV air drops (releases) the package from a predetermined height above the delivery destination area. The UAV may release the package while the UAV is substantially stopped and just hovering over the delivery destination area, or the UAV may release the package just before the delivery destination area while the UAV is in motion, that is, without stopping to hover.

The package free-falls to the delivery destination area, or the package falls at a speed affected by, for example, a parachute, drogue chute, retrograde propeller, or other speed-slowing technique. The customer may retrieve the package at the time of the air drop, or the customer may retrieve the package at a later time. For example, if the package is delivered to the back yard of the customer, behind a wall or fence, then the customer may request delivery at a time when the customer may not be at home to immediately retrieve the package. After retrieving the package the customer opens the package to recover the product.

The predetermined height at which the package is released may be determined by several variables, for example, the nature of the product, the weight of the product, the protection afforded by the package, the nature of the delivery destination area (e.g., concrete, dirt, or water), drift due to air currents, and the use of a speed-slowing technique. The package is preferably a foam package, such as an expanding foam, which may be an expanding foam plastic, which envelopes the product and prevents damage to the product when the package impacts the ground. The package, especially a foam plastic, may also protect the product from water or moisture, such as when the package is dropped into a swimming pool or pond.

Figure 1:
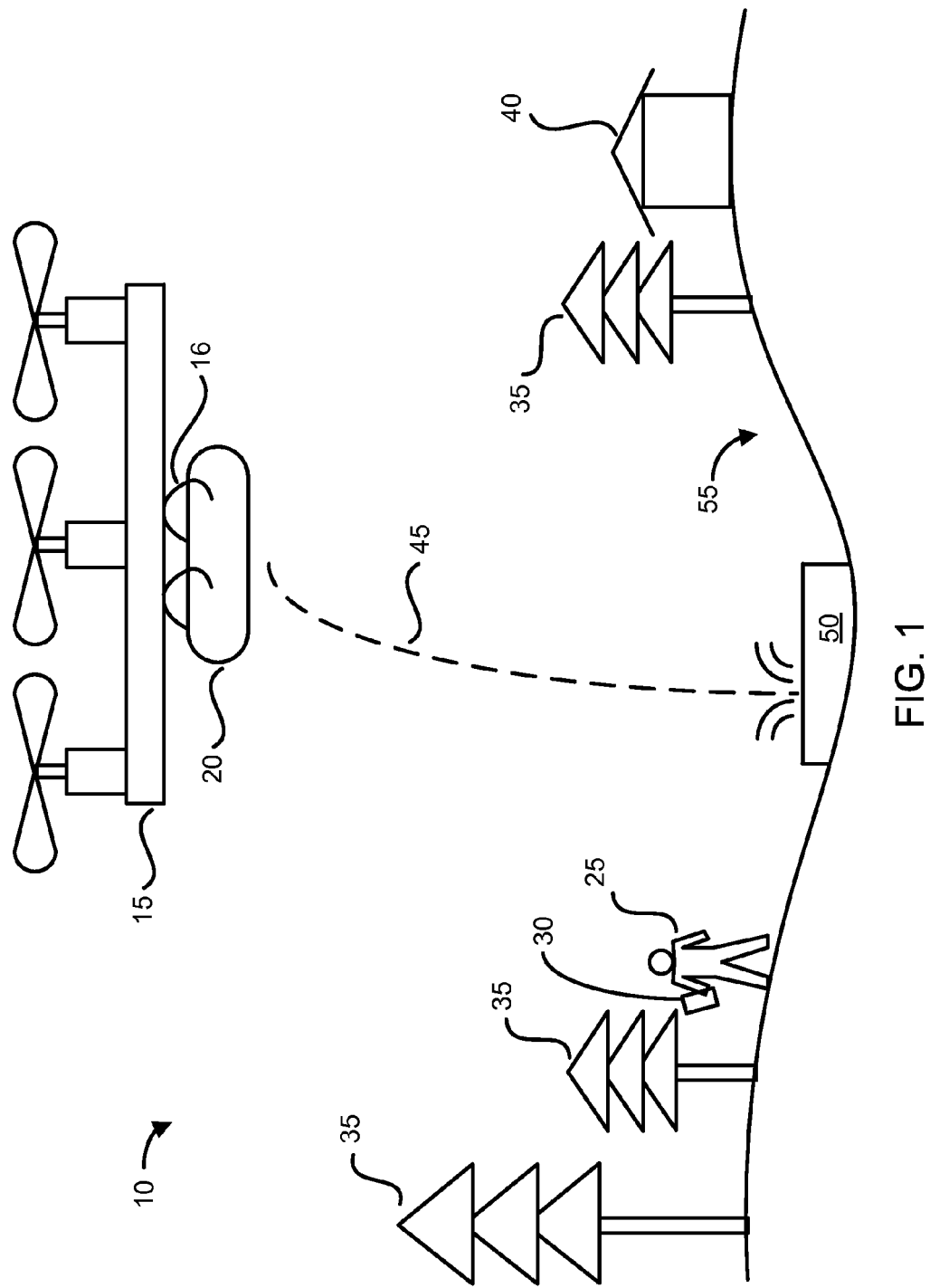
FIG. 1 is an illustration of an exemplary scenario for an aerial drop package delivery.

FIG. 1 is an illustration of an exemplary scenario 10 for an aerial drop package delivery. A UAV 15 is carrying a package 20 for delivery to a customer 25 that has placed an order for an item from a merchant or other entity. Techniques for a customer to search for and view products, select products, order products, and pay for products, are well known and are not discussed in detail herein.

In an implementation the customer 25 specifies a delivery location which may be, but is not necessarily, a house or business address. When the customer 25 places an order, or at some time thereafter, the customer 25 goes to a location where the customer 25 would like to receive the package 20. The customer 25 then uses a cellphone 30, or some other device, with a Global Positioning System (GPS) application (app) to obtain the GPS coordinates of the location, that is, the GPS coordinates of the delivery destination area. Alternatively, the customer 25 can use an Internet mapping service to obtain the GPS coordinates of the delivery destination area. The customer 25 then uploads the GPS coordinates to the merchant website, and these coordinates then become part of the order, that is, they become the address preferred by the customer for delivery of the order. The customer may also provide a preferred date and time of delivery. In the scenario shown in FIG. 1, the delivery destination area may be any location suitable for an air drop, for example, a swimming pool 50, or an open area 55, such that the package 20, when dropped, will not get caught in trees 35 or land on the pitched roof of a house 40. However, if the customer 25 lives in a house with a flat roof, or an apartment with a flat roof, or works in an office building having a flat roof, then the delivery destination area could be the roof of that structure.

The day and time of delivery are may be selected and/or accepted by the customer, merchant, or delivery service to minimize the likelihood of the package damaging a vehicle or other property, or harming a person. For example, many businesses, religious institutions, parks, and multi-family residences (apartments, townhomes, condominiums, etc.) have large parking lots or open areas which are mostly vacant on certain days or at certain times and could be designated as the delivery destination area.

The package is attached to the UAV 15 and the GPS coordinates are uploaded to the UAV 15. The UAV 15 is then launched so as to arrive at the delivery destination area at the specified time. The UAV 15 uses the GPS coordinates to guide itself to the delivery destination area. When the UAV 15 has arrived at the delivery destination area, or is about to arrive, the UAV 15 determines its height above the delivery destination area, compares that with a preferred drop height, and then adjusts its altitude to be at or below the preferred drop height. The preferred drop height might not be critical, so deviations from that preferred drop height may be acceptable. The preferred drop height might be based upon, for example, the nature of the product in the package 20, the nature of the package 20 (thickness, speed-reducing device, package orientation device), and/or the nature of the delivery destination area (hard, concrete, soft, lawn, sand, snow, liquid, etc.). Going below the preferred drop height, however, affects energy consumption, and going above the preferred drop height may increase the likelihood that the product in the package will be damaged. Also, the UAV 15 may be programmed not to exceed the preferred drop height, or not to exceed a specified maximum drop height. Once the UAV 15 is at or near the preferred drop height over the delivery destination area it causes the package holding mechanism or device 16 to release the package 20, which falls to the delivery destination area. For example, if the delivery destination area is a swimming pool 50, then the UAV 15 will release the package 20 so that it falls along a trajectory 45 to the swimming pool 50. As another example, the delivery destination area could be an open section 55 of a lawn, a park, a meadow, a yard, etc., and the package 20 would be released so that it falls into a selected one of those delivery destination areas. Also, as mentioned, the delivery destination area could be a rooftop.

The UAV 15 is generally stationary when the package 20 is released so as to maximize the accuracy of the delivery. In an implementation, the time that the UAV is stationary is the minimum time needed to verify the location and height of the UAV 15 and to release the package 20. This time may be longer if desired. In another implementation, the UAV 15 may be moving when the package 20 is released. In that case, the UAV 15 will account for its motion and determine when the package 20 should be released so that the package will still fall in the delivery destination area. The determination of when to release the package 20 may be calculated, or may be retrieved from a table using, for example, the speed of the UAV and the height of the UAV above the delivery destination. That table may be empirically generated, or mathematically generated and, may be empirically validated. There may also be different tables based upon the size, shape, and weight of the package. In one embodiment, the particular table or equation to be used is uploaded to the UAV 15 when the GPS coordinates are uploaded, but may be uploaded earlier, or even later, such as while the UAV 15 is in flight to the delivery destination area.

An above-ground release of the package 20 provides an energy savings over the other techniques mentioned above: land, release, and take off, or hover, lower by tether, release, and then retract the tether. The energy savings may be substantial when the package to be delivered and/or the tether mechanism is heavy, or the time required to lower the package by tether or retract the tether is not insignificant. Although the UAV 15 discussed herein may hover, or may use forward motion to remain in flight, neither is required for delivery. For example, the UAV 15 may release the package 20 while in flight, or may slow or halt its motion just long enough that the motion of the package 20 after release is primarily vertical, with little or no horizontal motion. In addition, such an air drop delivery provides additional security by allowing the package to be delivered behind a secure fence to reduce potential theft, such as where the customer authorizes delivery even when the customer cannot be at the delivery destination area. For example, delivery into a swimming pool generally means that the delivery is to the back of the house, so the package cannot be seen from the street, and the pool is generally fenced, thus again hiding the package from the street, and also reducing theft by a person who wants to make a quick entrance and exit, or be inconspicuous. Further, just the fact that the package is in a pool and is wet may serve as a theft deterrent.

This airborne delivery also provides for very fast service. For example, under a conventional package delivery service, the customer 25 may order an item, the item will be placed on one truck and transported from a warehouse to a distribution center, will be unloaded at one area (incoming) of the distribution center, will be moved to a sorting area of the distribution center, will be moved to a loading (outgoing) area, will be placed on a pallet to wait for an outgoing truck, will be placed on the outgoing truck, and will be transported on the outgoing truck from the distribution center to the delivery destination area. In contrast, after the customer 25 orders and item, this airborne delivery provides for a much faster delivery by the item. The package is loaded onto the UAV, the UAV is launched, the UAV reaches the delivery destination area, and the UAV then releases the package.

Figure 2:
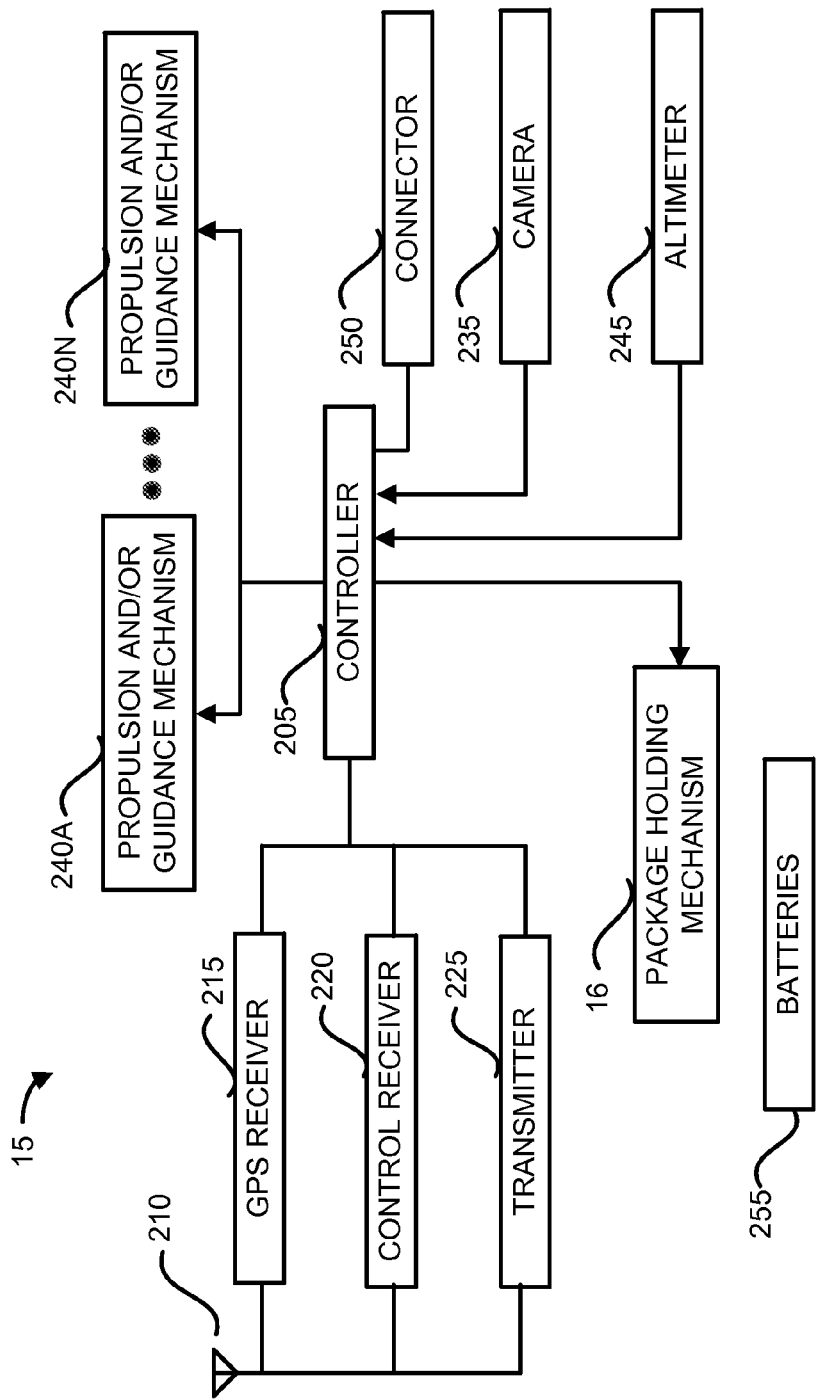
FIG. 2 is a block diagram of an exemplary unmanned aerial vehicle.

FIG. 2 is a block diagram of an exemplary UAV 15. The UAV 15 has a controller 205, one or more antennae 210, a GPS receiver 215, an optional control receiver 220, an optional transmitter 225, the package holding device 16, an optional camera 235, propulsion and/or guidance mechanisms 240A-240N, an altimeter 245, an optional communications/power connector 250, and batteries 255. There may be a single antenna 210 shared by the receivers 215 and 220 and transmitter 225, or two or more antennae. The control receiver 220 may be used to receive the GPS coordinates of the delivery destination area, receive the preferred release height, and receive other information or commands to be provided to the controller 205.

The control receiver 220 and transmitter 225 may be embodied as a single transceiver. A package holding device 16 may be, for example, a simple claw, gripper, or grapple, a releasable clamp, a bomb bay, a hook and eyelet, controllable jaws and eyelets, or even devices which may partially penetrate the package, such as tongs. The package holding device 16 may also be a suction device if the surface of the package 20 is appropriate for such. A suction device is, however, is less desirable due to energy requirements. There may also be a plurality of package holding devices 16, each one holding a different package and being independently controllable, and the different packages may have different delivery destination areas. An optional camera 235 may provide a view of the delivery destination area, or even a view in flight if desired. A fixed wing UAV or a lighter-than-air UAV (e.g., a dirigible or blimp) may have one or more propulsion mechanisms 240 (e.g., propellers) and one or more separate guidance mechanisms 240 (e.g., ailerons, rudders). A rotary wing UAV may have two or more propulsion and/or guidance mechanisms 240 (e.g., propellers, swashplates). The UAV may also be a hybrid aircraft, having both rotary wings and fixed wings. The altimeter 245 may be any convenient device which can provide the height of the UAV above the delivery destination area, for example, the GPS receiver, an RF, ultrasonic, optical, or infrared proximity sensor. The connector 250 may be used to provide power to charge the batteries 255 in the UAV 15. The connector 250 may also be used to provide GPS coordinates of the delivery destination area, preferred release height, release timing and/or height tables, and other information to the controller 205. The batteries 255 provide operating power to the various other components of the UAV 15. In one implementation, the propulsion mechanism 240 is an electric motor driving a propeller; the electric motor may be powered by the batteries 255. Solar cells (not shown) may even be used to charge the batteries 255 before, during, or after a flight. In another implementation the propulsion mechanism 240 is a small internal combustion engine or even a small turbine engine, in which case one or more of the propellers may be eliminated. Small internal combustion engines are often used for powering model airplanes. Other propulsion mechanisms, and combinations of propulsion mechanisms, may also be used depending upon cost, convenience, environmental considerations, range, weight of the package, etc.

In one mode of operation, the controller 205 receives the GPS coordinates of the delivery destination area and possibly its own current location through the control receiver 220 or the connector 250, or may use the GPS receiver 215 to determine its current location. The controller 205 then activates the propulsion and/or guidance mechanisms to take off and fly toward the delivery destination area. The altimeter 245 may provide height above ground information to the controller 205 while the UAV 15 is in flight. Once at or near the delivery destination area the altimeter 245 may provide height above delivery destination area information to the controller 205. When the controller 205 determines from the GPS coordinates and the altimeter information that the UAV 15 is above the delivery destination area and at the correct height above the delivery destination area then the controller 205 causes the package holding device 16 to release the package. The camera 235 may be used to record and/or transmit pictures of the actual delivery destination area, the package release, and the package pickup by the consumer 25 (or other person).

In another implementation, the camera 235 provides a picture of the delivery destination area, and the controller 205 causes that picture to be transmitted by the transmitter 225. The controller 205 may also cause the height information from the altimeter 245 to be transmitted by the transmitter 225. A human operator then views the picture to verify that the UAV 15 is over the delivery destination area and views the height information to verify that the UAV 15 is at the desired height above the delivery destination area.

If the location and height are proper the human operator can cause a release signal to be transmitted to the UAV 15. The control receiver 220 receives the signal and provides it to the controller 205, which then causes the package holding device 16 to release the package 20. The human operator can also use a joystick, keyboard, or other mechanism to send other control signals to the controller 205. For example, the human operator, upon viewing the picture from the camera, may determine that a vehicle has parked at the delivery destination area. The human operator may then send a control signal which causes the UAV 15 to move so that the package, when released, will not strike the vehicle. The human operator may also determine, from that picture, that the package should not be released. E.g., the human operator may determine from the picture that the delivery destination area is not suitable for a package drop, and send a signal instructing the UAV 15 to return to the departure point, to go to a recovery point, or to go to another delivery destination area to deliver another package. For example, the customer 25 may have selected that the package 20 be delivered (dropped) to a particular area of a park but the customer 25 did not know that particular area was scheduled to be used for a family reunion, soccer game, or other event at the specified delivery date and time. The human operator could then contact the customer 25 by cellphone and ask the customer 25 to select another nearby delivery destination area or select a different day and/or time.

Automatically after release of the package, or automatically after a predetermined time after release of the package, or in response to a command from the human operator received via the control receiver 220, the controller 205 will cause the UAV 15 to return to the departure point, to go to a recovery point, or to go to another delivery destination area to deliver another package. A human operator is shown as #710 in FIG. 7.

The package 20 may be just the product that the consumer 25 ordered if the product has a shape that allows it to be conveniently held and released by the package holding device 16 and if the product is of type and design that will not be damaged by being dropped. In most situations, however, the package 20 will surround the product, and will be of a shape or design that allows it to be conveniently held and released by the package holding device 16, and will protect the protect when the package is released from the UAV 15.

Several considerations may affect the selection of the packaging. For example, the packaging may be thicker to provide for more protection if the product is fragile. Also, thicker packaging may be desirable if a higher release point is desired. Further, thicker packaging may be desirable if the surface is hard (e.g., concrete instead of grass, bushes, or water). A plastic wrap (e.g., polyethylene), also referred to as a poly wrap, may surround the product or the package may be desired if the package is to be dropped into water (e.g., a pool or a pond). The package 20 may be streamlined to reduce air resistance and extend the range of the UAV 15. If the product should land in a particular position (e.g., upright, on its side, etc.) then the package may be shaped to cause the package to orient itself into that position prior to impact. Another method of automatic orientation is to adjust the weight distribution of the package 20 so that a preferred side is down (or up). For example, the package may be thicker on one side than on another side. As another example, a weight may be added at the bottom of the package; this approach is less desirable because it does add weight but it may be a preferred or acceptable approach in certain situations, such as where the travel range is limited.

As another example, product may be positioned toward the bottom (or the top) of the package. The shape of the package, weight distribution, and weight may be used separately or individually, as desired.

It may be preferred, because of the particular nature of a product, the drop height, or other requirements, that the velocity of the package prior to impact be reduced or minimized. In one implementation the package 20, upon release, or at a predetermined time after release, will deploy a parachute or a drogue chute (also sometimes referred to as a "drag chute"), retrograde propeller, or other speed-reducing device which will reduce the velocity of the package. A disadvantage of such devices is that they can directly and adversely affect the accuracy of the landing point of the package. The longer the time that the package is in the air the longer that the package can drift or be affected by air currents or wind gusts. These disadvantages may be acceptable, however, if the delivery destination area is large enough, such as a large pool, or a field.

A dropped package 20 may have a tendency to bounce, especially if the package 20 is a resilient material. Also, a backyard trampoline may make a preferred delivery destination area, but the package may rebound to a substantial height if some mechanism is not used to slow the descent of the package. Further, a streamlined shape, such as a cylinder, may impart a tendency for the package 20 to roll after impact. To reduce or eliminate these effects, a sticky material, such as tape or putty, may be affixed to one or more sides of the package 20. A material which adds weight, such as putty, may also serve to auto-orient the package prior to or after impact. The material could be added to the preferred side of the package 20 at any time prior to departure. The UAV 15 may, for example, sit on rails or bars so that the sticky material does not touch the floor of the takeoff area, or the UAV 15 have legs (not shown) which are long enough to prevent the sticky material from touching the floor of the takeoff area.

When the UAV 15 releases the package 20 there may be a recoil effect due to the sudden weight reduction. This may be advantageous in open areas, as it helps to lift the UAV 15 to a greater height for travel to the next destination. A rotary wing UAV 15, because of its greater maneuverability, may, however, be used to deliver a package to a sheltered location, such as under a carport, or inside a structure with a high ceiling, such as a hanger or a loading area. In such delivery locations the recoil may be undesirable as it might cause the UAV 15 to hit the ceiling of the structure. To avoid this, the controller 205 may be programmed to reduce the lift of the propulsion mechanisms 240 upon release of the package. In another embodiment, an accelerometer (not shown) may be used to sense the recoil and the controller 205 may be responsive to the accelerometer output to reduce the lift. In another embodiment, the controller 205 may include a table which specifies the lift reduction based upon, for example, the weight of the package.

An expanding foam, for example, an expanding foam plastic, is preferred for the packaging material around the product for the package 20. Corrugated cardboard, or other material, could be used for the package but are not preferred as they add weight, generally do not provide as much protection, and may not be usable when the package is to be dropped into water or if it is raining at the delivery destination area at the desired delivery area.

A poly wrap may be used to prevent moisture from reaching the product. The poly wrap may be placed around the product prior to the packaging material being applied. Alternatively, or in addition, the poly wrap may also be placed around the package 20 after the packaging material has been applied to the product. An exterior poly wrap provides a better surface than foam if suction devices are to be used to hold the product. An exterior poly wrap also provides a better surface than foam for applying labeling to the package 20. Such labeling may include information about the product or package, for example, one or more of the customer name, customer address, shipper name, shipper address, an identification number, the weight, a bar code, etc. In one implementation, a radio frequency identification (RFID) tag may be implanted into or on the foam packaging so as to provide one or more of information items mentioned above.

The information on the exterior poly wrap may also include an advertisement, etc. Further, customized or personalized information may be printed on the poly wrap such, for example, a birthday or anniversary greeting or decoration.

The expanded foam package is also thermally insulating. This preserves the temperature of the enclosed product. This also allows greater flexibility in the scheduled delivery of perishable items. This also allows delivery of hot or frozen products under environmental conditions which are not acceptable using current methods of delivery. For example, cake and ice cream being flown to a child's birthday party and dropped into the pool for a surprise.

The controller 205 comprises one or more standard programmable processors that perform arithmetic and logical operations necessary for the operation and control of the UAV 15. The controller 205 has computer-readable storage medium and computer-readable storage media, such as read-only memory ("ROM"), non-volatile RAM ("NVRAM"), and/or a mass storage device. The ROM and/or NVRAM may store basic routines that help or serve to start up the controller 205 and to transfer information between the various components and devices, and may also store other software components necessary for the operation of the controller 205 in accordance with the embodiments described herein. The mass storage device provides non-volatile storage, for example, for GPS coordinates, drop height and speed tables, pictures or video taken by the camera, system programs, application programs, and other program modules and data. For example, computer-readable storage media may include volatile and non-volatile, removable and non-removable media implemented in any method or technology such as, but not limited to, RAM, ROM, erasable programmable ROM ("EPROM"), electrically-erasable programmable ROM ("EEPROM"), flash memory or other solid-state memory technology, optical storage, magnetic cassettes, magnetic tape, magnetic disk storage or other magnetic storage devices, or any other medium that can be used to store the desired information.

Figure 3:
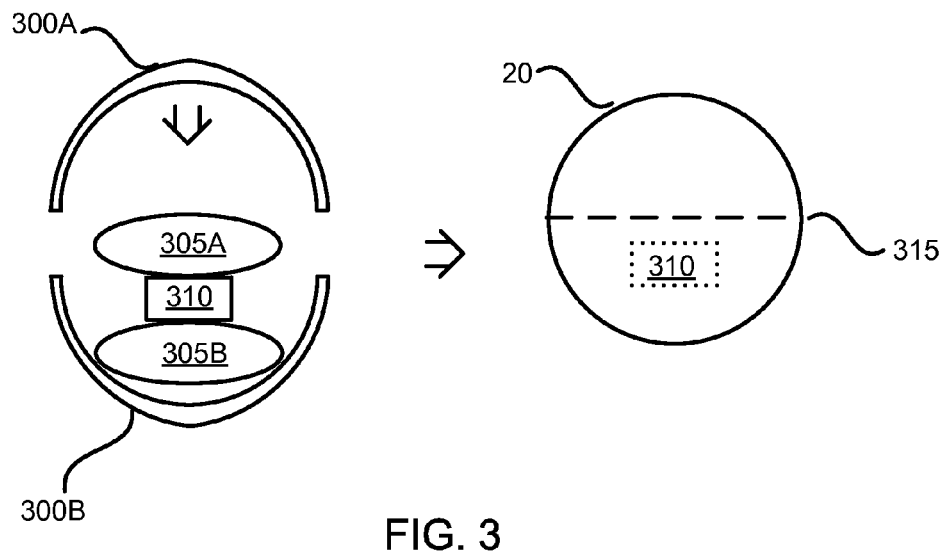
FIG. 3 is an illustration of an exemplary method of packaging a product.

FIG. 3 is an illustration of an exemplary method of packaging a product 310. A first expanding foam packet 305B is placed in a lower mold form 300B. The packet 305B may be shaped, if desired, to accommodate the particular shape of the product 310. The product 310 is placed on the foam packet 300B. A second expanding foam packet 305A is then placed on top of the product 310. The foam packets 305A and 305B are activated. Finally, an upper mold form 300A is pressed downward onto the lower mold form 300B. Once the expanding foam packets 305A, 305B have finished their expansion the mold forms 300A, 300B are removed. The result is the package 20 with the product 310 therein. The product 310 is shown below the center line or seam 315 to illustrate a placement to lower the center of gravity of the package 20. In this example the end-view of the package 20 is approximately a circle. The package 20 may, however, have a circular, tubular, spheroid, or other elongated shape. If the foam packets by themselves do not provide the desired sealing then further sealing may be appropriate. For example tape, such as a moisture impermeable plastic tape, may be applied to the seams. In another implementation, hot glue or other adhesive may be placed on the seam between two foam packets, or may be injected at various points on the seam. For example, before the second foam packet is placed into position, glue or other adhesive may be applied to one or both of the foam packets so that the packets are sealed together.

Expanding foam packets are commercially available. Typically, an expanding foam packet is activated by twisting or massaging the packet to break a seal between two different compartments in the packet to allow the two different chemical components to mix, and preferably twisting or massaging the packet somewhat after that point to ensure an even distribution of the chemicals.

The sequence of activation and the delay time between activations affect the final position of the product 310 in the package 20. For example, if it is desired that the product 310 be higher in the package 20, for example, to product for more cushioning or protection on the bottom of the product 310, packet 300B would be activated first and then, after a period of time, packet 300A would be activated. If it is desired that the product 310 be lower in the package 20, for example, to lower the center of gravity, packet 300B would be activated first, the product 310 placed top down onto packet 300B, and then, after a period of time, packet 300A would be activated. The final package 20 would then be rotated so that the product 310 was top side up.

Figure 4:
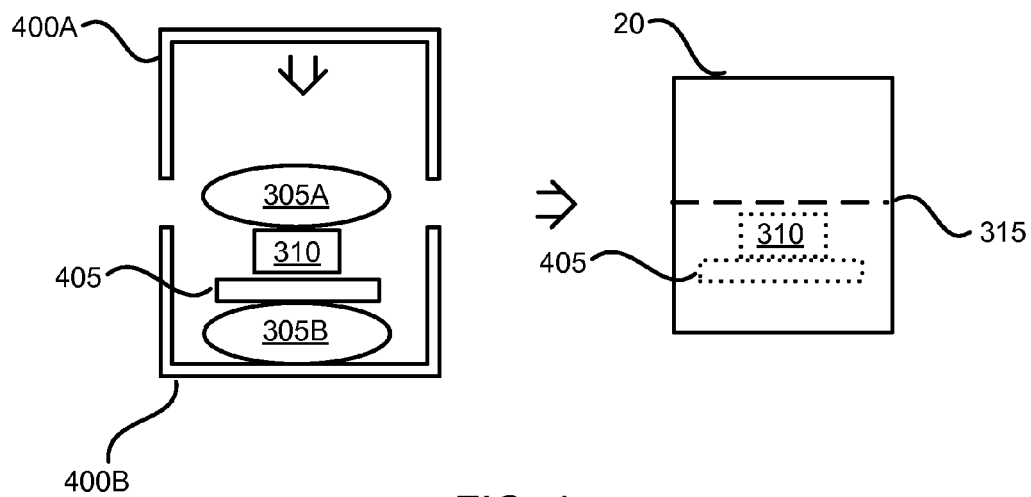
FIG. 4 is an illustration of another exemplary method of packaging a product.

FIG. 4 is an illustration of another exemplary method of packaging a product 310. A first expanding foam packet 305B is placed in a lower mold form 400B. A weight 405 and the product 310 are placed on the foam packet 300B, which is then activated. A second expanding foam packet 305A is then placed on top of the product 310 and then activated. Finally, an upper mold form 400A is pressed downward onto the lower mold form 400B. Once the expanding foam packets 305A, 305B have finished their expansion the mold forms 400A, 400B are removed. The result is the package 20 with the product 310 and weight 405 therein. The weight 405 and product 310 are shown below the center line or seam 315 to illustrate another method to lower the center of gravity of the package 20. The seam 315 may be sealed with, for example, tape or glue. In this example the end-view of the package 20 is approximately a square. The package 20 may, however, have a cubical, rectangular, or other elongated shape.

Although, in the above discussion of FIGS. 3 and 4, reference has been made to a packet being activated prior to the mold forms 400A, 400B being advanced toward each other, that is merely a preference and the packets may be activated as the mold forms 400A, 400B are being advanced, or even after the mold forms 400A, 400B have advanced and contacted each other.

In another implementation, instead of, or in addition to, the use of expanding foam packets 305, the mold forms 300, 400 may have one or more apertures (not shown) through which expanding foam is injected into the space defined by the mold foams. These and other packaging techniques which may be used are discussed in U.S. patent application Ser. No. 14/575,787, filed Dec. 18, 2014, and entitled "EXPANDED FOAM SHIPPING CONTAINER", which is hereby incorporated by reference in its entirety herein.

Figure 5:
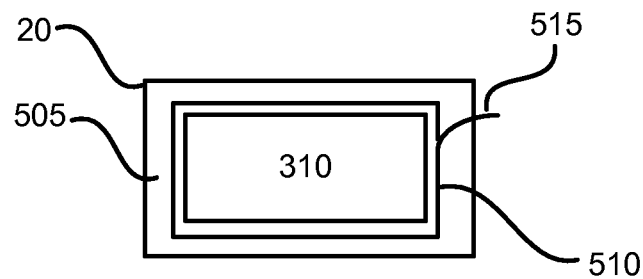
FIG. 5 is an illustration of an exemplary package which provides for convenient removal of the product from the package.

FIG. 5 is an illustration of an exemplary package 20 which provides for convenient removal of the product 310 from the package 20. Prior to the foam packets of FIG. 3 or FIG. 4 being activated the product 310 may be surrounded by a tape 510 or string with one end 515 being placed so as to protrude from the product 20. The customer can then grab the protruding end 515 and pull it to separate the package into two halves and retrieve the product 310.

Figure 6:
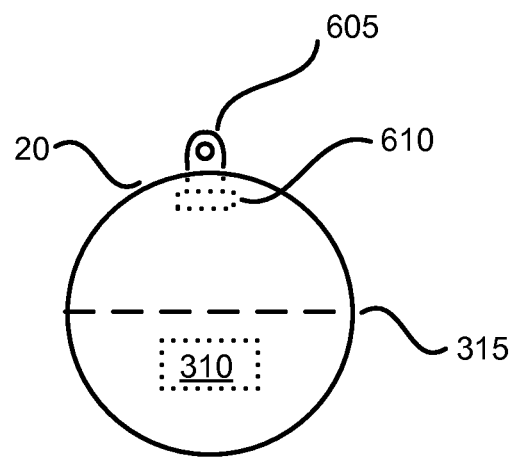
FIG. 6 is an illustration of an end view of an exemplary package with one or more eyelets.

FIG. 6 is an illustration of an end view of an exemplary package 20 with one or more eyelets 605. An eyelet 605 may have a base plate 610. The base plate 610 is of a size such that, once embedded into the foam, it provides structural integrity for the package and eyelets.

In an alternative implementation, a hole is formed or bored into the foam and the eyelet 605 is inserted into the foam. Glue or other adhesive may be used to bond the eyelet 605 and the foam together. The eyelets 605 provide an attachment point for the package holding device 16. One eyelet 605 may be adequate if the package 20 is generally shaped like a sphere and the weight is not excessive. Two or more eyelets 605 may be used if the package 20 is elongated or has more weight.

Figure 7:
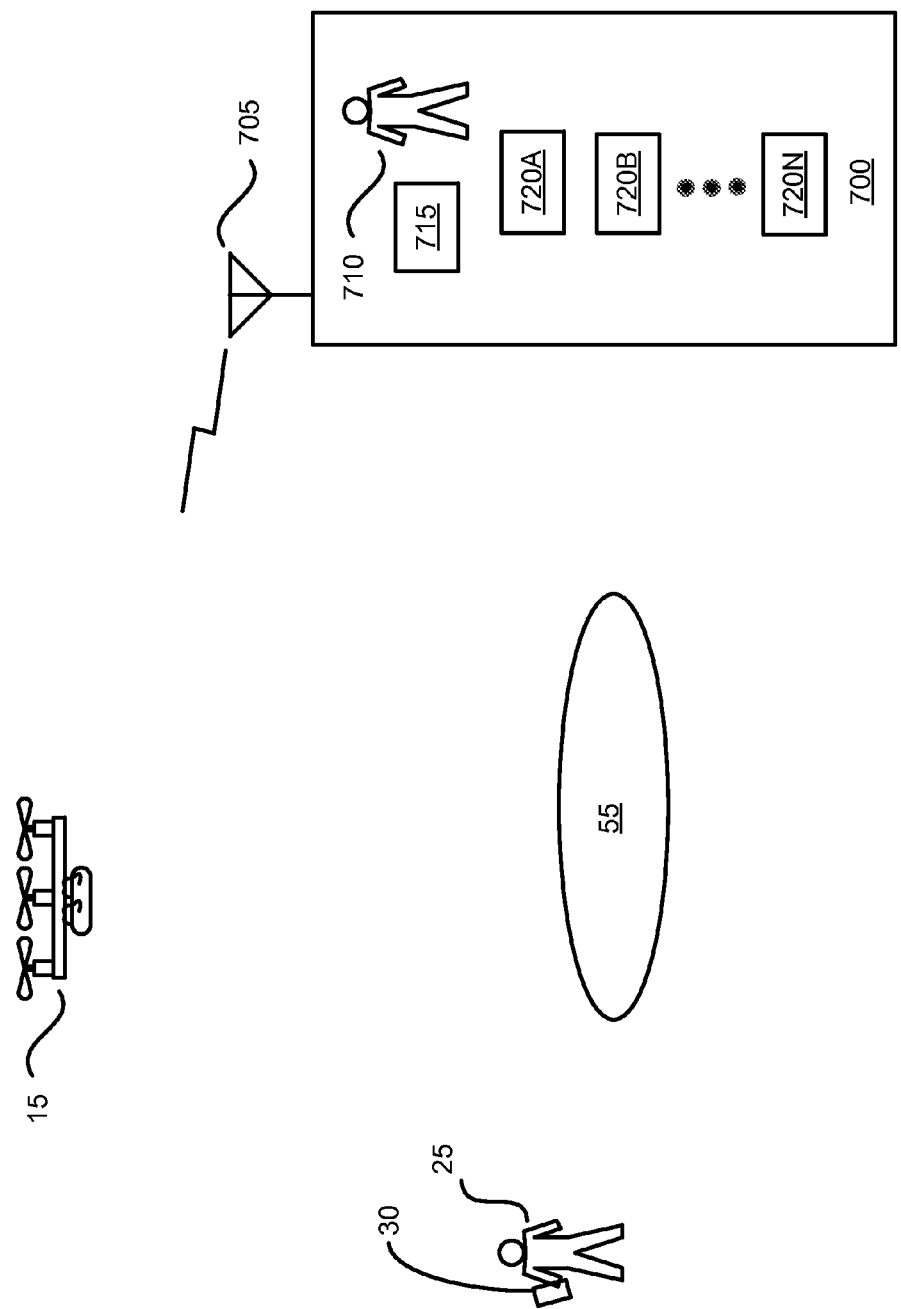
FIG. 7 is an illustration of an exemplary environment.

FIG. 7 is an illustration of an exemplary environment. A merchant order center 700 may have one or more human operators 710 who can communicate with the customer 25 via the customer's personal electronic device 30. The human operator 710 can also communicate with the UAV 15 via an antenna 705 which broadcasts RF signals to, and receives RF signals from, the UAV 15. The human operator 710 could view and control the operation of the UAV 15 using a control device 715, for example, a desktop computer, touchscreen, keyboard, joystick, laptop computer, etc. The merchant order center 700 will typically also have one or more servers 720A-720N. At least one of the servers 720 is connected to the Internet, to allow the customer 25 to view and order products 310. Also, at least one of the servers 720 is connected to the control device 715 to allow information about the product, delivery time, delivery location, customer communications regarding the delivery, actual delivery time, actual delivery location, images of the delivery location, to be provided to and/or received from the UAV 15 and the human operator 710. Construction of a server 720 is conventional (processor, memories, input/output devices, network interfaces, etc.) and will not be belabored here, but some of the operations performed by a server 720 are unique, as discussed below.

Figure 8A:
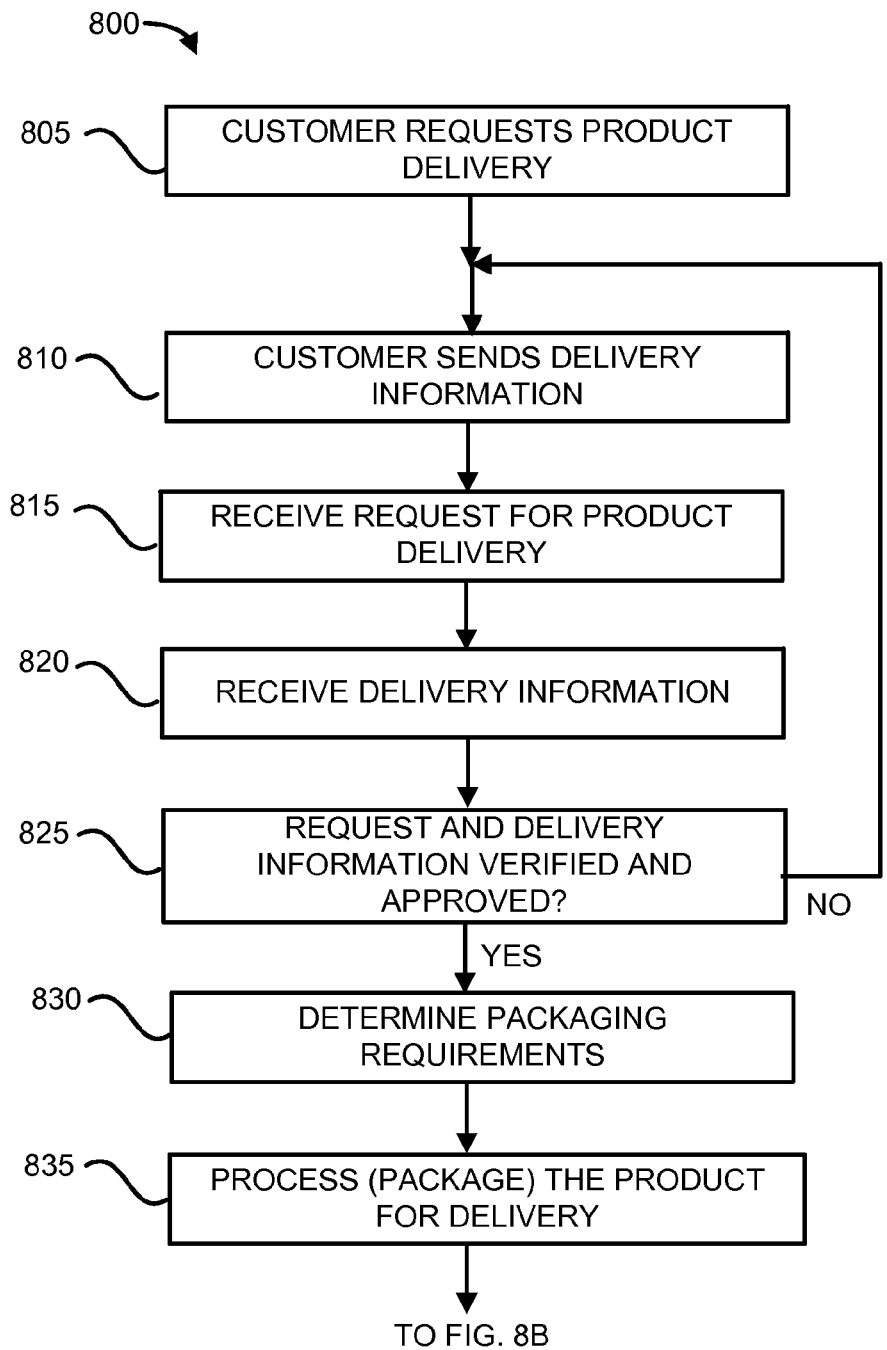
FIGS. 8A-8B are a flowchart of an exemplary method of operation.
Figure 8B:
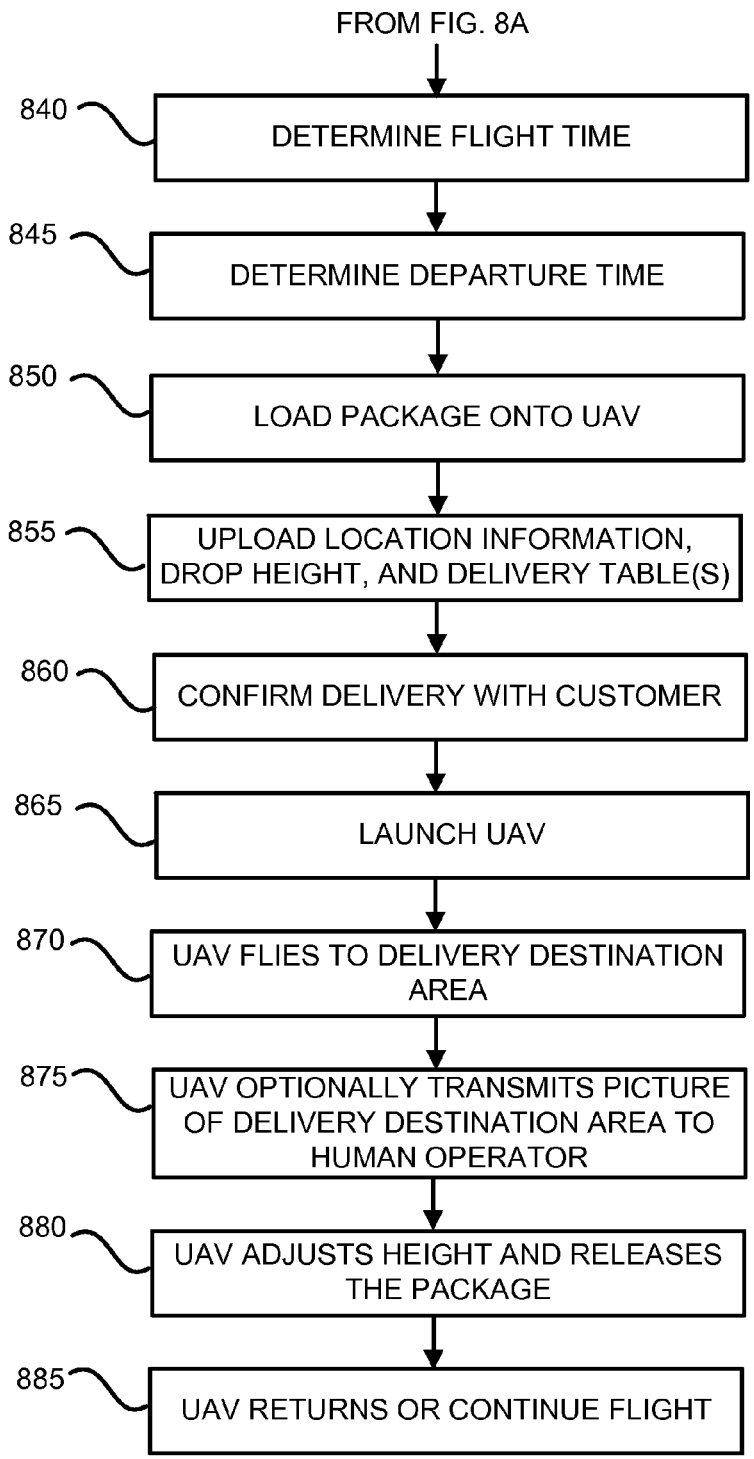

FIGS. 8A-8B are a flowchart of an exemplary method of operation 800. Many of the steps below are performed by, or in conjunction with, one or more of the servers 720. A customer 25 requests 805 that a merchant order center 700 to deliver a product 310. The product 310 may be, for example, a product that the customer 25 wishes to purchase, rent, lease, or borrow from the merchant order center 700. The customer 25 may have made payment arrangements for the product and delivery. Or, the product 310 may be a gift that some other person has ordered for the customer 25 and the customer 25 wishes to provide information as to where the gift should be delivered. The customer 25 sends 810 the preferred delivery information for the product 310 via, for example, a cellphone, a laptop, a desktop computer, or some other computing or communications device 30 which can communicate with the merchant order center 700. The delivery information may include, but is not limited to, location information for a requested delivery destination area 50, 55 for delivery of the package, a requested delivery date for the package, and/or a requested delivery time for the package. The order center receives 815 the request and receives 820 the delivery information. The order center then verifies and approves 825 the request and the delivery information. For example, the order center may check to verify that the order is valid, that the delivery destination area is an approved delivery destination area, that the delivery destination area is within range of the order center, that the delivery destination area is a delivery destination area that has been previously selected by that customer, that the delivery destination area is reasonable based upon the known work address or home address of the customer 25, etc.

For example, if the delivery destination area is the intersection of two highways in a city then the delivery destination area may be rejected, whereas the intersection of two local roads in an agricultural area may be approved. Also, for example, if the delivery destination area is a swimming pool, then it may be rejected for a summertime, mid-day, weekend delivery as there will most likely be a large number of people at the pool, but the delivery destination area may be approved for a fall delivery after 10:00 PM on a week night. If the delivery information cannot be verified or is not approved then the customer may send 810 the delivery information for a different delivery destination area, date, and/or time. As another example, the customer 25 may live in Atlanta, but a hacker is attempting to have the product delivered to a delivery destination area in Valdosta. As another example, the delivery information may be approved for air drop delivery of some products, such as but not limited to books, clothing, small personal electronic devices, etc., but may rejected for other products, such as an anvil or a big-screen TV.

Once the delivery information has been verified and approved for an air drop delivery the packaging requirements are then determined 830. For example, is the product to be bundled with other orders to the same customer at the same delivery destination area? What is the nature of the product? E.g., fragile, perishable, durable? A fragility rating may be assigned to different products. E.g., a wrench may have a fragility rating of zero ("0"), whereas a thin glass sphere may have a fragility rating of ten ("10"). Other numeric or alphabetical rating systems may also be used. What is the weight of the product? Should the product land in a preferred position? E.g., upright? Does the product need to be protected from water? E.g., is the delivery destination area a swimming pool? What is the maximum drop height or maximum impact speed for the product? I.e., is thicker foam, a parachute, or other protection required? A server 720 may then send instructions regarding construction of the package, as shown in FIGS. 3-6.

The product(s) 310 are then processed 835 for delivery. That is, the product 310 may be bundled with other products to the same customer at the same delivery destination area. The product is placed in the protective foam to form the package 20, an RFID tag inserted if desired, a parachute attached if appropriate, labeling applied if appropriate, etc.

The flight time from the order center to the delivery destination area is determined 840 based on, for example, such factors as the distance from the order center to the delivery destination area, the weight of the product, the size of the product, prevailing or expected wind speeds and direction in that area, the load and speed capabilities of the particular UAV 15, etc.

The departure time for the UAV 15 is then determined 845 based upon the determined flight time and the approved delivery time.

The package is then attached 850 to the UAV and the location information, preferred and/or maximum drop height, trajectory tables, etc., are uploaded 855 into the UAV 15. This may be done at any convenient time, such as when the UAV 15 is assigned to the delivery, when the package 20 is being attached to the UAV 15, or even after the UAV 15 has departed, although this last option is not preferred.

Preferably, but optionally, and not necessarily, the delivery information is confirmed 860 with the customer prior to or shortly after takeoff by the UAV. For example, the order center 700 may send an email message, text message, automated telephone call, etc., asking the customer 25 to confirm the delivery location, time, and/or date, such as by pressing a button, sending a reply email or text message, calling a number, etc. If the customer 25 does not respond then the UAV 15 could be launched anyway, or the delivery could be delayed or cancelled until the customer calls in and confirms or reschedules the delivery.

If the delivery information is confirmed by the customer, or if delivery is to be made even without confirmation by the customer, then the UAV 15 is launched 865 at the scheduled departure time. The UAV 15 then flies 870 to the delivery destination area. As the UAV 15 is approaching the delivery destination area, or after the UAV 15 has reached the delivery destination area, as determined by the GPS coordinates or other location information, then the UAV 15 may optionally, but not necessarily, transmit 875 a picture of the delivery destination area to the order center 700 or to another location where a human operator 710 can view and verify the delivery destination area, or steer the UAV 15 to a different delivery destination area. Finally, the UAV adjusts 880 its height in accordance with the predetermined drop height and releases the package, which may fall substantially straight down or may follow a ballistic trajectory, depending upon the lateral motion of the UAV. Ideally, the UAV will arrive at the delivery destination area at approximately the specified drop time. If the UAV arrives early, or late, the human operator 710 may use the camera to determine whether the customer is there to receive the package, or may call the customer to determine whether to release the package. Also, depending upon the nature and security of the delivery destination area, "approximately" may mean anything from a few minutes to an hour or even more. The UAV then either returns 885 to the launch area or continues to another location, such as a recovery area, or to a next delivery destination area.

Thus, a package 20 may be delivered to a delivery destination area 50, 55 without a UAV having to land and then take off, and without the UAV having to hover, deploy, and then retract a tether.

The subject matter described herein is provided by way of illustration for the purposes of teaching, suggesting, and describing, and not limiting or restricting. Combinations and alternatives to the illustrated embodiments are contemplated, described herein, and set forth in the claims. The phrase "for example" means "by way of example and not of limitation." Various modifications and changes may be made to the subject matter described herein without strictly following the embodiments and applications illustrated and described, and without departing from the scope of the following claims.

What is claimed is:

1. A method to deliver a product using an unmanned aerial vehicle (UAV), the method comprising:
receiving, from a personal electronic device of a customer, a request to deliver the product;
receiving location information indicating a delivery destination for the product;

calculating a drop height above the delivery destination from which the product is to be dropped, the drop height being based at least in part upon a nature of the product, a nature of the package, and a nature of the delivery destination;

determining, based at least in part on the calculated drop height, a package to provide protection for the product;

inserting the product and an expanding foam into a mold form;

forming the package around the product using the expanding foam and the mold form;

attaching the package to a package holding device of the UAV; and dispatching the UAV to the calculated drop height above the delivery destination.

2. The method of claim 1, further comprising releasing the package from the determined drop height after the UAV arrives at the delivery destination.

3. The method of claim 1, further comprising:
receiving a specified delivery time for the package;
determining an estimated departure time for the UAV to reach the delivery destination at the specified delivery time; and
dispatching the UAV carrying the package no later than the estimated departure time.

4. The method of claim 1, further comprising:
prior to dispatching the UAV, requesting confirmation of at least one of the location information, the delivery destination, or the specified delivery time; and
wherein the UAV is dispatched if confirmation is received.

5. A system to package a product to be delivered by an unmanned aerial vehicle (UAV), the system comprising:
one or more servers to:
receive, from a customer's personal electronics device, an electronic request to deliver the product,
receive location information from the personal electronic device indicating a delivery destination for the product,
calculate a drop height above the delivery destination at which the product is to be dropped, the drop height being based at least in part upon attributes of the product, the package, and the delivery destination,
determine, based at least in part on the calculated drop height, a construction for a package to protect the product, and
dispatch the UAV carrying the package to the calculated drop height at the delivery destination; and
mold forms, to receive expanding foam to enclose the product and create the package, the mold forms not being part of the package.

6. The system of claim 5, wherein the location information received by the one or more servers comprises Global Positioning System (GPS) coordinates.

7. The system of claim 5, wherein the one or more servers receive at least one image of the delivery destination and cause that information to be displayed to an operator.

8. The system of claim 5, wherein the one or more servers determine an estimated departure time for the UAV based on at least one of a specified delivery time or a distance the UAV must travel to the delivery destination.

9. The system of claim 5, wherein the one or more servers determine a preferred orientation for the product, and cause the product to be positioned in the package so that a center of gravity of the package orients the product in the preferred orientation.

10. The system of claim 5, wherein the one or more servers determine a preferred orientation for the product, and cause a weight to be placed in the package so that a center of gravity of the package with the product and the weight orients the product in the preferred orientation.

11. The system of claim 5, wherein the one or more servers cause a sticky material to be placed on at least one side of the package to reduce the tendency of the package to roll.

12. The system of claim 5, wherein the one or more servers determine whether the package should have one or more of: an aerodynamically streamlined shape, a speed reducing device, an eyelet to lift the package, or a tape or string to open the package.

13. The system of claim 5, wherein the one or more servers, prior to the dispatch of the UAV,
send a request to a user for confirmation of at least one of the location information, the delivery destination, or the specified delivery time, and
receive from the user a confirmation of the at least one of the location information, the delivery destination, or the specified delivery time.

14. The method of claim 1 and further comprising providing identification information for the package, the identification information comprising at least one of: an identification of a recipient of the package, an order number, the delivery destination, or an identification of the product within the package.

15. The method of claim 14, further comprising providing a poly wrap around the package and imprinting the identification information on the poly wrap.

16. The method of claim 1, further comprising inserting a radio frequency identification (RFID) tag into the expanding foam.

17. A method comprising:
receiving, from a customer's personal electronics device, a request to deliver a product via an unmanned aerial vehicle (UAV);
determining location information indicating a delivery destination for the product;
calculating a drop height above the delivery destination from which the product is to be dropped, the drop height being based at least in part upon at least one of a nature of the product, a nature of the package, or a nature of the delivery destination;
determining, based at least in part on the calculated drop height, a package to provide protection for the product;
determining a preferred orientation for the product, and positioning the product in the package so that a center of gravity of the package with the product orients the product in the preferred orientation;
generating the package around the product using expanding foam and mold forms;
dispatching the UAV carrying the package to the calculated drop height above the delivery destination;
receiving a signal from the UAV indicating the UAV is at the delivery destination and at the drop height; and
sending a signal to the UAV, the signal causing the UAV to release the package at the delivery destination from the calculated drop height.

18. The method of claim 17, further comprising placing a weight in the package so that a center of gravity of the package with the product and the weight orients the product in the preferred orientation.

19. The method of claim 17, further comprising placing a sticky material on at least one side of the package to reduce the tendency of the package to roll.

20. The method of claim 17, where the drop height is based on attributes associated with the product, the package, and the delivery destination.

* * * * *